United States Patent
Watanabe et al.

(10) Patent No.: US 7,090,747 B2
(45) Date of Patent: Aug. 15, 2006

(54) BELT FOR PAPERMARKING AND PROCESS FOR PRODUCING PAPERMAKING BELT

(75) Inventors: Atsuo Watanabe, Hirakata (JP); Takahisa Hikida, Hirakata (JP); Atsushi Watanabe, Hirakata (JP)

(73) Assignee: Yamauchi Corporation, Osaka (JP)

( * ) Notice: Subject to any disclaimer, the term of this patent is extended or adjusted under 35 U.S.C. 154(b) by 114 days.

(21) Appl. No.: 10/415,401

(22) PCT Filed: Nov. 7, 2001

(86) PCT No.: PCT/JP01/09757

§ 371 (c)(1),
(2), (4) Date: Apr. 29, 2003

(87) PCT Pub. No.: WO02/38859

PCT Pub. Date: May 16, 2002

(65) Prior Publication Data

US 2004/0029474 A1      Feb. 12, 2004

(30) Foreign Application Priority Data

Nov. 10, 2000   (JP)   .............................. 2000-343712

(51) Int. Cl.
*D21F 3/00* (2006.01)
*B32B 7/02* (2006.01)
*B32B 27/40* (2006.01)

(52) U.S. Cl. .................. 162/358.4; 162/306; 162/901; 442/64; 442/67; 442/71; 428/167

(58) Field of Classification Search ................ 162/306, 162/348, 358.2, 358.4, 900–904, 116, 117, 162/362; 442/64–67, 71; 528/59–66; 428/163, 428/167, 297.4, 301.4, 339
See application file for complete search history.

(56) References Cited

U.S. PATENT DOCUMENTS

| 4,559,258 | A |   | 12/1985 | Kiuchi |        |
| 4,595,742 | A | * | 6/1986  | Nalepa et al. ............... 528/64 |
| 4,769,202 | A |   | 9/1988  | Eroskey et al. |
| 4,975,515 | A | * | 12/1990 | Nalepa et al. ............... 528/64 |
| 5,134,010 | A |   | 7/1992  | Schiel |
| 5,277,728 | A |   | 1/1994  | Stigberg |
| 5,646,230 | A |   | 7/1997  | Pantone et al. |
| 5,821,316 | A |   | 10/1998 | Quay et al. |

(Continued)

FOREIGN PATENT DOCUMENTS

EP      0 509 460 A1    10/1992

(Continued)

OTHER PUBLICATIONS

Japanese Office Action dated Sep. 16, 2003, with English translation.
Japanese Patent Application 2000-343712, filed Jun. 224, 2003, mailed Aug. 5, 2003, with partial English Translation.

(Continued)

*Primary Examiner*—Eric Hug
(74) *Attorney, Agent, or Firm*—Birch, Stewart, Kolasch & Birch, LLP

(57) ABSTRACT

A papermaking belt which prevents cracking and inhibits crack growth which includes a reinforcing substrate embedded in a thermosetting polyurethane layer so that the reinforcing substrate and the thermosetting polyurethane layer are integrated with each other and the outer peripheral surface and the inner peripheral surface of the belt are formed by polyurethane layers, the polyurethane layer forming the outer peripheral surface being made of a composition containing a urethane prepolymer having isocyanate groups on its ends and a hardener containing dimethylthiotoluenediamine.

16 Claims, 7 Drawing Sheets

U.S. PATENT DOCUMENTS

| | | | |
|---|---|---|---|
| 5,895,689 A | | 4/1999 | Gajewski |
| 5,895,806 A | * | 4/1999 | Gajewski ............... 528/60 |
| 5,968,318 A | | 10/1999 | Hasegawa et al. |
| 6,042,695 A | | 3/2000 | Ishino |
| 6,046,297 A | * | 4/2000 | Rosenberg et al. ......... 528/63 |
| 6,086,719 A | | 7/2000 | Hasegawa et al. |
| 6,114,488 A | * | 9/2000 | Kulp et al. ............. 528/49 |
| 6,127,505 A | * | 10/2000 | Slagel ................. 528/61 |

FOREIGN PATENT DOCUMENTS

| | | |
|---|---|---|
| EP | 0659934 A2 | 6/1995 |
| EP | 0 877 118 A2 | 11/1998 |
| EP | 0 939 162 A2 | 9/1999 |
| EP | 0 960 975 A2 | 12/1999 |
| EP | 2000-17594 A | 1/2000 |
| EP | 0982079 A2 | 3/2000 |
| EP | 1 033 380 A1 | 9/2000 |
| JP | 59-54598 U | 4/1984 |
| JP | 4-119191 A | 4/1992 |
| JP | 6-200496 A | 7/1994 |
| JP | 6-287885 A | 10/1994 |
| JP | 2542250 B2 | 7/1996 |
| JP | 10-298893 A | 11/1998 |
| JP | 2889341 B2 | 2/1999 |
| JP | 11-509264 | 8/1999 |
| JP | 11-247086 A | 9/1999 |
| JP | 3045975 B2 | 3/2000 |
| JP | 3053374 B2 | 4/2000 |
| JP | 2000-248040 A | 9/2000 |
| JP | 2001-516820 | 10/2001 |
| WO | 97/42246 A1 | 11/1997 |
| WO | WO 97/42246 A1 | 11/1997 |
| WO | 99/14426 A1 | 3/1999 |
| WO | WO99/14426 A1 | 3/1999 |
| WO | 01/70841 A2 | 9/2001 |

OTHER PUBLICATIONS

Polymer, vol. 36, No. 4 (1995), Beck et al., "The Effect of Curative on the Fracture Toughness of PTMEG/TDI Polyurethane Elastomers", pp. 767-774.

Polymer, 40 (1999), pp. 307-313, Beck et al., "The Effect of Stoichiometry on the Fracture Toughness of a Polyurethane-Urea Elastomer".

Wear, 218 (1998), pp. 145-152, Beck et al., "Effect of Chemical Structure on the Wear Behaviour of Polyurethane-Urea Elastomers".

Polyurethane Manufactures Association, Oct. 24, 1988, Simon et al., "Studies of an Aromatic Diamine in MDI Systems".

Journal of Elastomers and Plastics, vol. 20, Apr. 1988, Nalepa et al., "A New Curative for Cast Elastomers".

Plyurethane Resin Handbook, Iwata, Nikkan Kogyo Shimbunsha.

"Recent Developments in High Performance Castable Elastomers," A. Singh et al., Uniroyal Chemical Co. Inc. Middlebury, USA, UTECH Asia 1995, paper 43, pp. 1-9.

R. A. Beck et al., "Effect of Curative and Stoichiometry on the Hysteresis in Polyurethane-ureas," Journal of Applied Polymer Sciencem vol. 71, pp. 959-966.

Third Party Observation According to Article 115 EPC for European Patent Application 01 981 01175.5-2115 (Apr. 4, 2005).

Decision for Refusal for Japanese Patent Application 2000/343,712 (Jan. 25, 2005).

Nalepa, C.J., and Eisenbraun, A.A., "A New Liquid Aromatic Diamine Curative for Polyurethane Cast Elastomers", SPI 30th Annual Technical/Marketing Conference, 1986, pp. 228-233.

Nalepa, C.J., and Eisenbraun, A.A., "A High Performance Amine Curative for Polyurethane Cast Elastomers", paper, Oct. 13, 1986, pp. 1-9, Polyurethane Manufacturers Association, Nashville, U.S.

Nalepa et al, "A New Curative for Cast Elastomers", Polyurethanes World Congress, 1987, pp. 808-814.

* cited by examiner

US 7,090,747 B2

BELT FOR PAPERMARKING AND PROCESS FOR PRODUCING PAPERMAKING BELT

This application is the national phase under 35 U.S.C. §371 of PCT International Application No. PCT/JP01/09757 which has an International filing date of Nov. 7, 2001, which designated the United States of America.

TECHNICAL FIELD

The present invention relates to a papermaking belt. More specifically, it relates to an improvement of polyurethane in a papermaking belt formed by integrating a reinforcing substrate and a thermosetting polyurethane layer with each other. It also relates to an improvement in a method of manufacturing a papermaking belt formed by integrating a reinforcing substrate and a thermosetting polyurethane layer with each other. In particular, the present invention is used for a shoe pressing belt, a calender belt and a sheet transfer belt used for the paper industry.

BACKGROUND ART

In recent years, the so-called shoe pressing dehydration of a wet web by pressing one surface of the wet web placed on a felt member traveling at a high speed with a press roll while pressurizing the other surface with a pressure shoe through an endless belt, is widely used in a press part of a papermaking step, in order to improve the dehydration effect for the wet web. In shoe pressing, a belt endlessly formed by integrating a reinforcing substrate and a thermosetting polyurethane layer is employed in general. Also in a calender step of smoothing and glossing the surface of paper, employment of the aforementioned elastic belt has been recently studied. In addition the employment of the aforementioned elastic belt has been also studied as a sheet transfer belt for preventing a web break and stably transporting a wet web, particularly when performing papermaking at a high speed. Japanese Utility Model Laying-Open No. 59-54598, Japanese Patent No. 2889341, Japanese Patent No. 3045975 or the like discloses a typical structure of such a papermaking belt prepared by covering both surfaces of a fabric base with an elastic material. Japanese Patent No. 2542250 or the like discloses another typical structure prepared by embedding reinforcing yarns in an elastic material.

As an elastic material for the papermaking belt, a thermosetting polyurethane prepared by mixing a urethane prepolymer and a hardener with each other and hardening the mixture is generally used as disclosed in Japanese Patent No. 2889341, Japanese Patent Laying-Open No. 6-287885, Japanese Patent No. 3045975, Japanese Patent No. 3053374, Japanese Patent Laying-Open No. 11-247086 or the like, and 4,4'-methylene-bis-(2-chloroaniline) (hereinafter referred to as "MOCA") is employed as the hardener in thermosetting polyurethane used for the papermaking belt.

Generally in shoe pressing, severe bending and pressing are repeated on the belt between the press roll and the pressure shoe, and hence a polyurethane layer forming the belt becomes disadvantageously cracked. This cracking is mainly caused on the outer peripheral surface of the belt coming into contact with the felt member or paper. While grooves are generally formed on the outer peripheral surface of a belt for a dehydrating press used in the press part for improving the dehydrating efficiency, the cracking is readily caused on the bottom edges and the top edges of these grooves in particular. A crack once caused tends to grow into a larger crack as the belt is used. In this case, lubricating oil stored between the inner peripheral surface of the belt and the pressure shoe externally leaks to exert a bad influence on the paper or cause a delamination of the belt. Thus, occurrence and growth of the crack causes a reduction in the life of the belt. Therefore, suppression of occurrence and growth of cracks is strongly demanded in relation to a papermaking belt employed for shoe pressing or the like. Further, delamination may result from weak adhesion between the fabric base and the polyurethane layer, and prevention of such delamination of the fabric base and the polyurethane layer is strongly demanded.

DISCLOSURE OF THE INVENTION

The present invention solves the aforementioned problems, and an object thereof is to provide a papermaking belt, formed by integrating a reinforcing substrate and a thermosetting polyurethane layer with each other, capable of preventing cracking. Another object of the present invention is to provide a papermaking belt, formed by integrating a reinforcing substrate and a thermosetting polyurethane layer with each other, capable of suppressing growth of a crack even if the crack is caused on the papermaking belt. Still another object of the present invention is to provide a papermaking belt, formed by integrating a reinforcing substrate and a thermosetting polyurethane layer with each other, capable of suppressing delamination between the reinforcing substrate and the polyurethane layer. A further object of the present invention is to provide a method of manufacturing the aforementioned papermaking belt.

The papermaking belt according to the present invention is a papermaking belt comprising a reinforcing substrate embedded in a thermosetting polyurethane layer and having an outer peripheral surface and an inner peripheral surface formed by the said polyurethane layer, while a polyurethane layer forming the outer peripheral surface is made of a composition containing a urethane prepolymer having isocyanate groups on ends and a hardener containing dimethylthiotoluenediamine.

In the papermaking belt according to the present invention, the said urethane prepolymer and the said hardener are mixed with each other in a ratio setting the value of the equivalent ratio (H/NCO) between active hydrogen groups (H) of the said hardener containing dimethylthiotoluenediamine and the isocyanate groups (NCO) of the said urethane prepolymer to 1<H/NCO<1.15.

The papermaking belt according to the present invention is a papermaking belt comprising a reinforcing substrate embedded in a thermosetting polyurethane layer and having an outer peripheral surface and an inner peripheral surface formed by the said polyurethane layer, while a polyurethane layer forming the outer peripheral surface is made of a composition containing a urethane prepolymer having isocyanate groups on ends and a hardener having active hydrogen groups on ends, and the said urethane prepolymer and the said hardener are mixed with each other in a ratio setting the value of the equivalent ratio (H/NCO) between the active hydrogen groups (H) of the said hardener and the isocyanate groups (NCO) of the said urethane prepolymer to 1<H/NCO<1.15. In the present invention, the equivalent ratio is a stoichiometric equivalent ratio.

The papermaking belt according to the present invention is a papermaking belt comprising a reinforcing substrate embedded in a thermosetting polyurethane layer with the said polyurethane layer including an inner polyurethane layer and an outer polyurethane layer adhering to the outer peripheral surface of this inner polyurethane layer, while each of the said inner polyurethane layer and the said outer polyurethane layer is made of a composition containing a urethane prepolymer having isocyanate groups on ends and a hardener having active hydrogen groups on ends. The composition forming the said inner polyurethane layer is prepared by mixing the urethane prepolymer and the hardener with each other in a ratio setting the equivalent ratio (H/NCO) between the active hydrogen groups (H) of the hardener and the isocyanate groups (NCO) of the urethane prepolymer to 0.85 ☐ H/NCO<1, and the composition forming the said outer polyurethane layer is prepared by mixing the urethane prepolymer and the hardener with each other in a ratio setting the value of the said equivalent ratio (H/NCO) to 1<H/NCO<1.15.

In the papermaking belt according to the present invention, the adhesive surface between the said inner polyurethane layer and the said outer polyurethane layer is present in the said reinforcing substrate, the urethane prepolymer forming the said inner polyurethane layer contains a urethane prepolymer obtained by reacting polyol and diphenylmethane diisocyanate (MDI) with each other, and the urethane prepolymer forming the said outer polyurethane layer contains a urethane prepolymer obtained by reacting polyol and tolylene diisocyanate (TDI) with each other.

In the papermaking belt according to the present invention, at least 50 wt. % of the hardener forming the said inner polyurethane layer is preferably polyol.

In the papermaking belt according to the present invention, the said reinforcing substrate preferably contains multi-woven fabric.

In the papermaking belt according to the present invention, the said outer polyurethane layer adheres to the outer peripheral surface of the said inner polyurethane layer, forms the outer peripheral surface of the papermaking belt, and is made of a composition containing a urethane prepolymer having isocyanate groups on ends and a hardener containing dimethylthiotoluenediamine.

In the papermaking belt according to the present invention, the said thermosetting polyurethane layer includes an inner polyurethane layer, an outer polyurethane layer adhering to the outer peripheral surface of this inner polyurethane layer and a polyurethane layer located on the outer side of this outer polyurethane layer for forming the outer peripheral surface of the papermaking belt, and the said polyurethane layer forming the outer peripheral surface is made of a composition containing a urethane prepolymer having isocyanate groups on ends and a hardener containing dimethylthiotoluenediamine.

In the papermaking belt according to the present invention, the composition of the said polyurethane layer forming the outer peripheral surface is preferably prepared by mixing the said urethane prepolymer and the said hardener with each other in a ratio setting the value of the equivalent ratio (H/NCO) between the active hydrogen groups (H) of the said hardener and the isocyanate groups (NCO) of the said urethane prepolymer to 1<H/NCO<1.15.

In the papermaking belt according to the present invention, the said polyurethane layer is preferably hardened at a temperature of 120° C. to 140° C.

In another papermaking belt according to the present invention, grooves are formed on the outer peripheral surface thereof.

The method of manufacturing a papermaking belt according to the present invention is a method of manufacturing a papermaking belt including an inner polyurethane layer and an outer polyurethane layer adhering to the outer peripheral surface of this inner polyurethane layer by embedding a reinforcing substrate in a thermosetting polyurethane layer thereby integrating the said reinforcing substrate and the said thermosetting polyurethane layer with each other, including a first step of hardening a liquid mixture, containing a urethane prepolymer having isocyanate groups on ends and a hardener having active hydrogen groups on ends, prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to 0.85≦H/NCO<1 at a temperature of 70° C. to 100° C. for forming the said inner polyurethane layer, a second step of applying a liquid mixture, containing a urethane prepolymer having isocyanate groups on ends and a hardener having active hydrogen groups on ends, prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to 1<H/NCO<1.15 onto the outer peripheral surface of the said inner polyurethane layer, and a third step of heating the whole to a temperature of 120° C. to 140° C. for hardening the liquid mixture applied onto the outer peripheral surface of the inner polyurethane layer and forming the outer polyurethane layer while bonding and integrating the inner polyurethane layer and the outer polyurethane layer to and with each other.

In another method of manufacturing a papermaking belt according to the present invention, the said reinforcing substrate is impregnated with the said inner polyurethane layer from one surface side of the said reinforcing substrate to an intermediate portion of the thickness of the said reinforcing substrate, and the said reinforcing substrate is impregnated with the said outer polyurethane layer from the other surface side of the said reinforcing substrate to the position where the said reinforcing substrate is impregnated with the said inner polyurethane layer.

In the method of manufacturing a papermaking belt according to the present invention, the said reinforcing substrate preferably contains multi-woven fabric.

Still another method of manufacturing a papermaking belt according to the present invention includes a step of winding the said reinforcing substrate on the outer peripheral surface of the said inner polyurethane layer before or after hardening the said inner polyurethane layer.

BEST MODES FOR CARRYING OUT THE INVENTION

Figure 1:
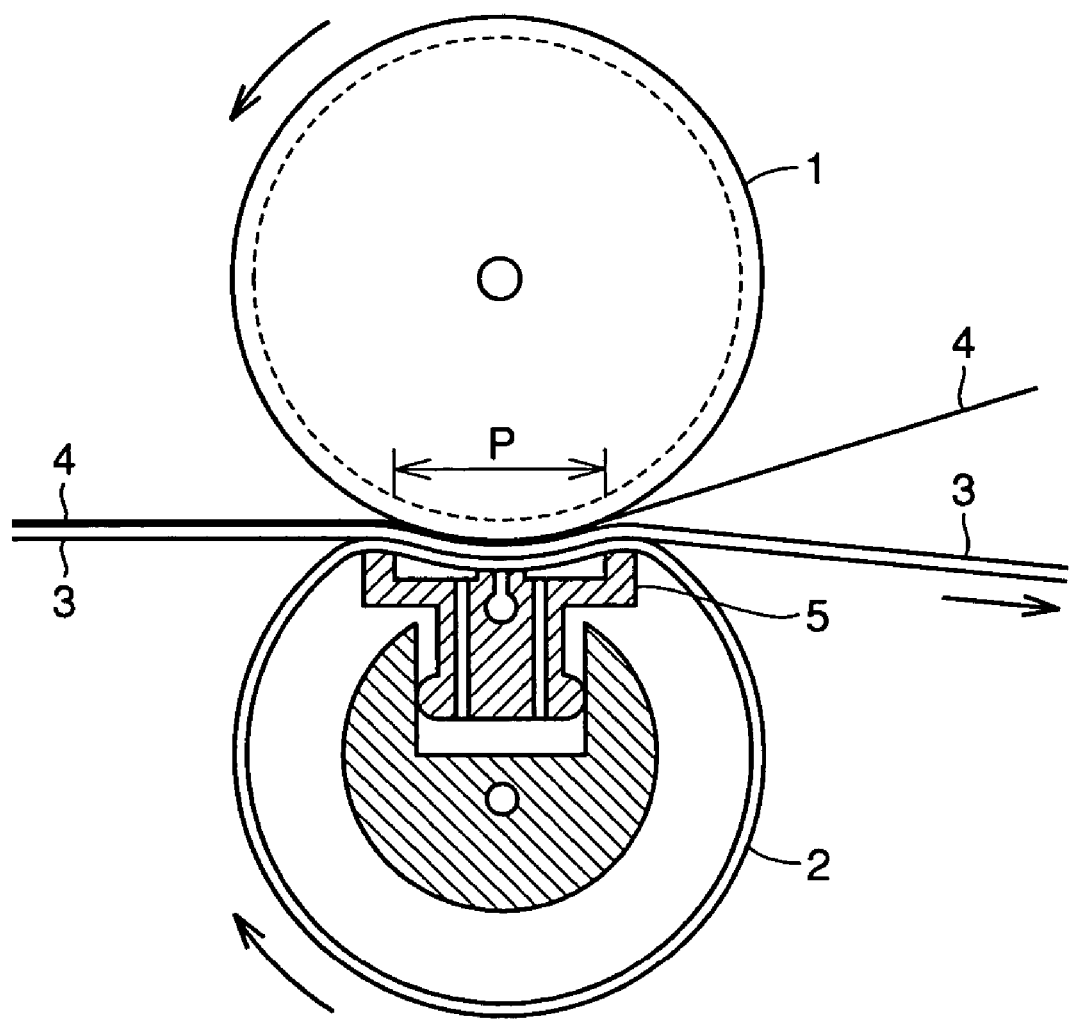
FIG. 1 is an explanatory diagram showing a shoe pressing apparatus.

FIG. 1 shows an exemplary shoe pressing apparatus used for a press part of a papermaking step. Referring to FIG. 1, a flexible cylindrical dehydrating press belt 2 is provided under a press roll 1. A felt member 3 and a wet web 4 are passed between the belt 2 and the press roll 1. The outer peripheral surface of the belt 2 is in direct contact with the felt member 3. A pressure shoe 5 is pressed against the inner peripheral surface of the belt 2 toward the press roll. Lubricating oil is supplied between the pressure shoe 5 and the belt 2 for smoothly running the belt 2. The belt 2 travels while sliding on the pressure shoe 5 due to friction with the felt member 3. The pressure shoe 5 has a concave surface corresponding to the surface of the press roll 1. A pressurizing/dehydrating part P having a large width is formed between the press roll 1 and the pressure shoe 5. This pressurizing/dehydrating part dehydrates the wet web 4.

Figure 2:
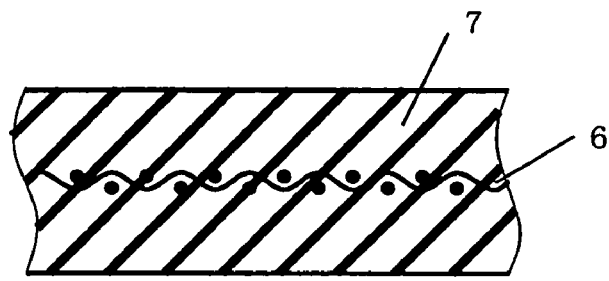
FIG. 2 is a local sectional view showing an exemplary papermaking belt according to the present invention.

FIG. 2 is a local sectional view showing an exemplary belt 2. This belt is an endless belt formed by integrating a fabric base 6 defining a reinforcing substrate and a thermosetting polyurethane layer 7 with each other. The fabric base 6 is made of organic fiber such as polyamide or polyester. The fabric base 6 is impregnated and covered with the polyurethane layer 7 consisting of a monolayer. The outer peripheral surface and the inner peripheral surface of the belt are formed by the polyurethane layer 7.

In order to prepare the belt shown in FIG. 2, a relatively open weave endless fabric base 6 capable of passing liquid polyurethane is employed. A plain-woven fabric base having 10 to 100 meshes can be used as the open weave fabric base. The term "mesh" stands for the number of yarns per inch. A papermaking belt formed by integrating the fabric base 6 and the polyurethane layer 7 with each other so that the fabric base 6 is embedded in the polyurethane layer 7 can be manufactured by arranging the said fabric base 6 on a mandrel while defining a clearance between the same and the mandrel and casting the polyurethane layer 7 from above.

Figure 3:
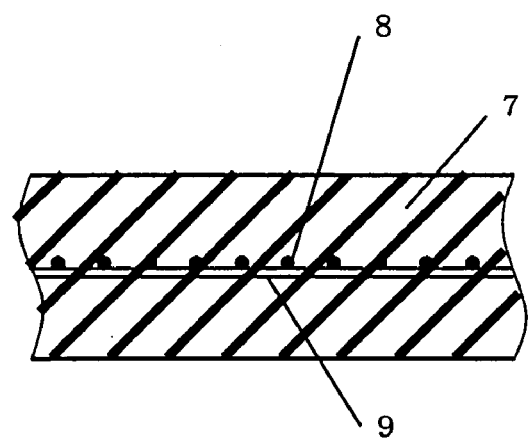
FIG. 3 is a local sectional view showing another exemplary papermaking belt according to the present invention.

FIG. 3 shows an example employing reinforcing yarns 8 and 9 as a reinforcing base substrate in place of the fabric base 6 of the belt shown in FIG. 2. In the belt shown in FIG. 3, the reinforcing yarns 8 and 9 are embedded in a thermosetting polyurethane layer 7 consisting of a monolayer. The reinforcing substrate is formed by the yarns 8 in the belt traveling direction (hereinafter referred to as an "MD") and the yarns 9 in a direction (hereinafter referred to as a "CMD") perpendicular thereto. A number of yarns 8 in the MD and a number of yarns 9 in the CMD are arranged substantially at regular intervals. For example, polyamide, aromatic polyamide, polyester or the like can be used as the material for the yarns. The belt shown in FIG. 3 can be manufactured by stretching the yarns 8 and 9 in the circumferential direction and in the axial direction on a mandrel while defining a clearance between the same and the mandrel and casting the polyurethane layer 7 from above. In other words, it is possible to manufacture a papermaking belt formed by integrating the reinforcing substrate employing the reinforcing yarns 8 and 9 and the polyurethane layer 7 with each other so that the reinforcing substrate employing the reinforcing yarns 8 and 9 is embedded in the polyurethane layer 7.

Figure 4:
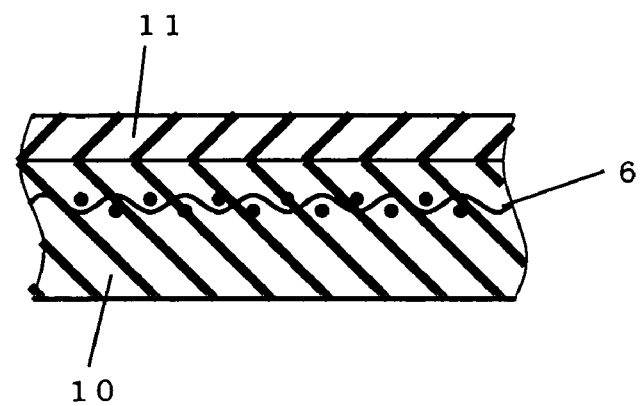
FIG. 4 is a local sectional view showing still another exemplary papermaking belt according to the present invention.
Figure 5:
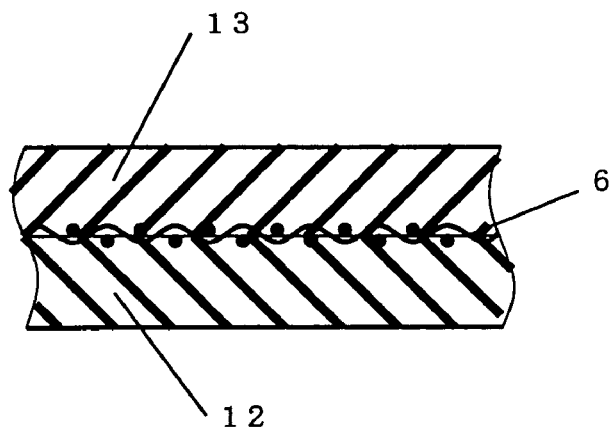
FIG. 5 is a local sectional view showing a further exemplary papermaking belt according to the present invention.
Figure 6:
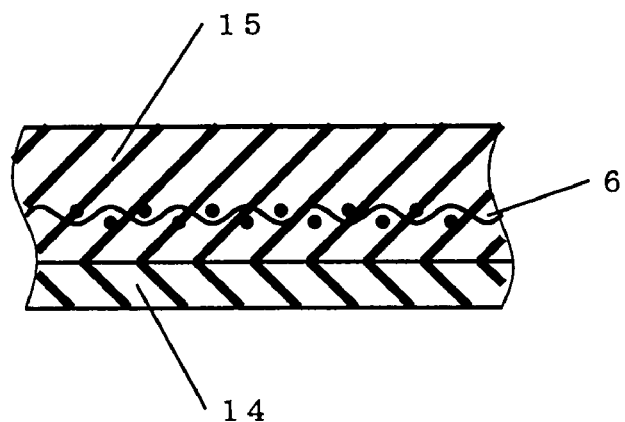
FIG. 6 is a local sectional view showing a further exemplary papermaking belt according to the present invention.

Each of FIGS. 4 to 6 shows an example prepared by forming the polyurethane layer 7 of the belt shown in FIG. 2 by two layers.

Referring to FIG. 4, a fabric base 6 is embedded in a polyurethane layer 10 forming an inner peripheral surface and further covered with a polyurethane layer 11 forming an outer peripheral surface, to be integrated. In order to manufacture the belt shown in FIG. 4, the relatively open weave fabric base 6 is arranged on a mandrel while defining a clearance between the same and the mandrel and the polyurethane layer 10 is cast from above, after the method of fabricating the belt shown in FIG. 2. The polyurethane layer 10 is so cast from above as to form a polyurethane layer consisting of the fabric base 6 and the polyurethane layer 10 integrated with each other so that the fabric base 6 is embedded in the polyurethane layer 10. The belt can be manufactured by further coating this polyurethane layer with the polyurethane layer 11 forming the outer peripheral surface.

The belt shown in FIG. 5 is manufactured by integrating a fabric base 6 and two polyurethane layers 12 and 13 with each other by impregnating and covering both surfaces of the fabric base 6 with the polyurethane layers 12 and 13, for obtaining a papermaking belt having the fabric base 6 embedded in the polyurethane layers 12 and 13. In order to manufacture this belt, the fabric base 6 turned inside out is coated with the polyurethane layer 12 forming an inner peripheral surface, the fabric base is then turned inside out, and coated with the polyurethane layer 13 forming an outer peripheral surface. In this case, the fabric base 6 serving as a reinforcing substrate is prepared from a fine weave material allowing no passage of liquid polyurethane. A multi-woven fabric base having permeability of 200 to 20 cm$^3$/cm$^2$·s can be used as the fine weave fabric base.

As another manufacturing method, the polyurethane layer 12 forming the inner peripheral surface is molded on a mandrel and thereafter the fabric base 6 is wound on the surface and further coated with the polyurethane layer 13 forming the outer peripheral surface, thereby obtaining a papermaking belt formed by integrating the fabric base 6 and the polyurethane layers 12 and 13 with each other so that the fabric base 6 is embedded in the polyurethane layers 12 and 13.

Referring to FIG. 6, the lower portion of a polyurethane layer 15 forming an outer peripheral surface having a fabric base 6 embedded therein is covered with a polyurethane layer 14 forming an inner peripheral surface, to be integrated. In order to manufacture this belt, the polyurethane layer 15 forming the outer peripheral surface having the fabric base embedded therein is molded after the method of manufacturing the belt shown in FIG. 2, and the inner peripheral surface thereof is coated with the polyurethane layer 14 forming the inner peripheral surface later. As another method, the polyurethane layer 14 forming the inner peripheral surface is previously molded on a mandrel, and the polyurethane layer 15 forming the outer peripheral surface having the fabric base embedded therein is molded thereon after the method of fabricating the belt shown in FIG. 2.

Figure 7:
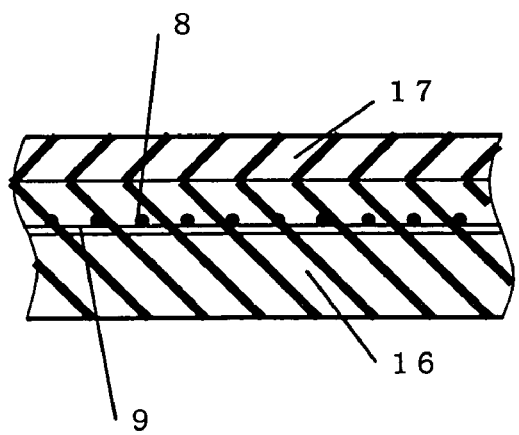
FIG. 7 is a local sectional view showing a further exemplary papermaking belt according to the present invention.
Figure 8:
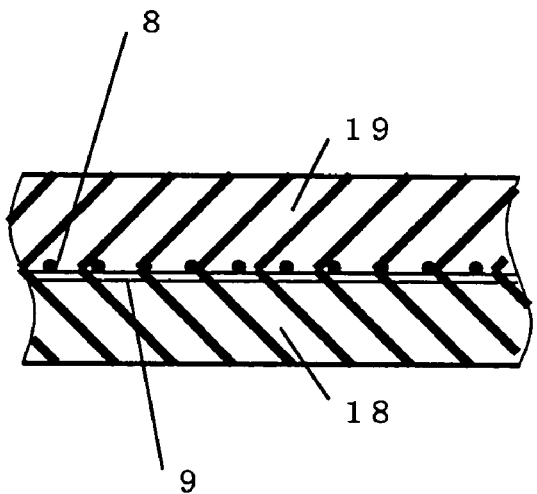
FIG. 8 is a local sectional view showing a further exemplary papermaking belt according to the present invention.
Figure 9:
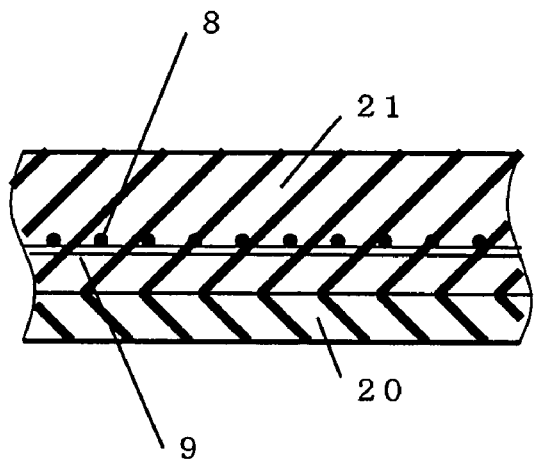
FIG. 9 is a local sectional view showing a further exemplary papermaking belt according to the present invention.

FIGS. 7 to 9 show examples, corresponding to the examples shown in FIGS. 4 to 6 respectively, employing reinforcing yarns 8 and 9 as reinforcing substrates in place of the fabric base 6.

In order to manufacture the belt shown in FIG. 7, a polyurethane layer 16 forming an inner peripheral surface having the reinforcing yarns 8 and 9 embedded therein may be molded after the method of manufacturing the belt shown in FIG. 3, to be coated with a polyurethane layer 17 forming an outer peripheral surface.

In order to manufacture the belt shown in FIG. 8, a polyurethane layer 18 forming an inner peripheral surface may be molded on a mandrel for thereafter winding yarns 8 and 9 in the circumferential direction and in the axial direction on the surface and further coating the same with a polyurethane layer 19 forming an outer peripheral surface.

In order to manufacture the belt shown in FIG. 9, a polyurethane layer 21 forming an outer peripheral surface having reinforcing yarns 8 and 9 embedded therein is molded after the method of manufacturing the belt shown in FIG. 3 and the inner peripheral surface thereof is coated with a polyurethane layer 20 forming an inner peripheral surface later. As another method, the polyurethane layer 20 forming the inner peripheral surface is previously molded on a mandrel, for thereafter molding the polyurethane layer 21 forming the outer peripheral surface having the reinforcing yarns 8 and 9 embedded therein after the method of manufacturing the belt shown in FIG. 3.

The outer peripheral surface of each of the belts shown in FIGS. 2 to 9 is formed by a polyurethane layer. The polyurethane layer 7, 11, 13, 15, 17, 19 or 21 forming the outer peripheral surface is made of a composition containing a urethane prepolymer having isocyanate groups (NCO) on ends and a hardener having active hydrogen groups (H) on ends. The urethane prepolymer is obtained by reacting polyol and a phenylene isocyanate derivative with each other.

The polyol for obtaining the urethane prepolymer for the polyurethane layer 7, 11, 13, 15, 17, 19 or 21 forming the outer peripheral surface is selected from polyether polyol and polyester polyol. Polyethylene glycol (PEG), polypropylene glycol (PPG), polytetramethylene glycol (PTMG) or the like can be listed as polyether polyol, for example. Polycaprolactone ester, polycarbonate, polyethylene adipate, polybutylene adipate, polyhexene adipate or the like can be listed as polyester polyol. These can be individually employed or at least two of these can be mixed or polymerized with each other, and a modified body of any of these can also be employed.

Tolylene diisocyanate (TDI), diphenylmethane diisocyanate (MDI), m-xylene diisocyanate (m-XDI), naphthalene diisocyanate (NDI) or the like can be listed as the phenylene isocyanate derivative for obtaining the urethane prepolymer for the polyurethane layer 7, 11, 13, 15, 17, 19 or 21 forming the outer peripheral surface, for example. These can be individually employed or at least two of these can be mixed with each other.

In general, a polyol, aromatic diol or aromatic diamine hardener is used as the hardener for the polyurethane layer 7, 11, 13, 15, 17, 19 or 21 forming the outer peripheral surface. It is possible to use polytetramethylene glycol (PTMG), polypropylene glycol (PPG) or the like as the polyol hardener. Hydroqhinone di(β-hydroxyethyl) ether (HQEE) or the like can be used as the aromatic diol hardener. 4,4'-methylene-bis-(2-chloroaniline) (MOCA), trimethylene-bis(4-aminobenzoate) (CUA-4), diethyltoluenediamine (DETDA), dimethylthiotoluenediamine (DMTDA) or the like can be used as the aromatic diamine hardener. As a characteristic of the present invention, it is preferable to use a hardener containing dimethylthiotoluenediamine, a kind of aromatic diamine hardener, among these. 3,5-dimethylthio-2,4-toluenediamine expressed in the following formula 1 can be used as dimethylthiotoluenediamine:

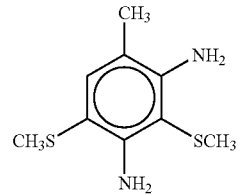

Formula 1

3,5-dimethylthio-2,6-toluenediamine expressed in the following formula 2 can be used as dimethylthiotoluenediamine:

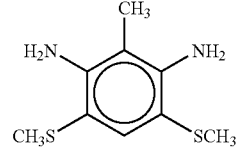

Formula 2

3,5-dimethylthio-2,4-toluenediamine or 3,5-dimethylthio-2,6-toluenediamine can be employed individually or as a mixture. A mixture of 3,5-dimethylthio-2,4-toluenediamine and 3,5-dimethylthio-2,6-toluenediamine, put on the market as "ETHACURE 300" from ALBEMARLE Corporation, can be listed as a particularly preferable hardener.

When the hardener for the polyurethane layer 7, 11, 13, 15, 17, 19 or 21 forming the outer peripheral surface contains the aforementioned dimethylthiotoluenediamine, one or two types of hardeners of polyol, aromatic diol, aromatic diamine and the like may be mixed into the same. The content of the aforementioned dimethylthiotoluenediamine in the hardener for the polyurethane layer 7, 11, 13, 15, 17, 19 or 21 forming the outer peripheral surface preferably occupies at least 50% of the number of active hydrogen groups (H) of the hardener. When the hardener for the polyurethane layer 7, 11, 13, 15, 17, 19 or 21 forming the outer peripheral surface contains dimethylthiotoluenediamine, the polyurethane layer 7, 11, 13, 15, 17, 19 or 21 forming the outer peripheral surface of the belt can be inhibited from cracking.

From another point of view, the urethane prepolymer and the hardener are mixed with each other in a ratio setting the value of the equivalent ratio (H/NCO) between the active hydrogen groups (H) of the hardener and the isocyanate groups (NCO) of the urethane prepolymer to 1<H/NCO<1.15 for the polyurethane layer 7, 11, 13, 15, 17, 19 or 21 forming the outer peripheral surface. Even if a small crack occurs on the polyurethane layer 7, 11, 13, 15, 17, 19 or 21 forming the outer peripheral surface of the belt, the crack can be suppressed from growing into a large crack due to this structure. In the polyurethane layer 7, 11, 13, 15, 17, 19 or 21 forming the outer peripheral surface, the urethane prepolymer and the hardener can also be mixed with each other in a ratio setting the value of the equivalent ratio (H/NCO) to $1.01 \leq H/NCO \leq 1.14$, so that, even if a small crack occurs, the crack can be more accurately suppressed from growing into a large crack in this case. If the value of the equivalent ratio H/NCO in the polyurethane layer 7, 11, 13, 15, 17, 19 or 21 forming the outer peripheral surface is not more than 1, a crack tends to grow into a large crack. If the value of the equivalent ratio H/NCO in the polyurethane layer 7, 11, 13, 15, 17, 19 or 21 forming the outer peripheral surface is in excess of 1.15, on the other hand, the polyurethane layer is so fragile that a crack readily occurs.

When a hardener containing dimethylthiotoluenediamine is used as the hardener for the polyurethane layer 7, 11, 13, 15, 17, 19 or 21 forming the outer peripheral surface while the urethane prepolymer and the hardener are mixed with each other in a ratio setting the value of the equivalent ratio (H/NCO) between the active hydrogen groups (H) of the hardener and the isocyanate groups (NCO) of the urethane prepolymer to $1 < H/NCO < 1.15$, the polyurethane layer 7, 11, 13, 15, 17, 19 or 21 forming the outer peripheral surface of the belt can be inhibited from cracking, and even if a small crack occurs, this crack can be suppressed from growing into a large crack. The content of dimethylthiotoluenediamine in the hardener preferably occupies at least 50% of the number of active hydrogen groups (H) in the hardener. The urethane prepolymer and the hardener are preferably mixed with each other in the ratio setting the value of the equivalent ratio (H/NCO) to $1.01 \leq H/NCO \leq 1.14$.

Figure 10:
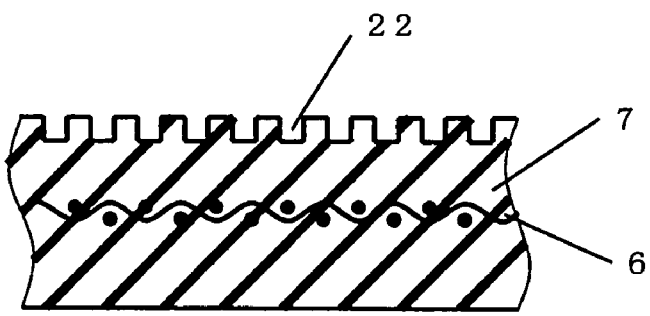
FIG. 10 is a local sectional view showing a further exemplary papermaking belt according to the present invention.

In order to improve the dehydration efficiency, a number of grooves 22 are preferably formed on the outer peripheral surface of the belt shown in each of FIGS. 2 to 9 along the traveling direction of the belt, as shown in FIG. 10. According to the present invention, cracking on the papermaking belt and growth of the crack can be suppressed due to the aforementioned structure, whereby cracking from the bottom edges and the top edges of the grooves 22 can be suppressed also when the grooves 22 are formed on the outer peripheral surface of the belt. A number of blind holes may be provided on the outer peripheral surface of the belt in place of or along with the grooves 22.

While only a single polyurethane layer is provided in addition to the polyurethane layer 7, 11, 13, 15, 17, 19 or 21 forming the outer peripheral surface in each of FIGS. 4 to 9, the polyurethane layer 10, 12, 14, 16, 18 or 20 other than the polyurethane layer forming the outer peripheral surface may be divided into a plurality of layers.

While each belt has an endless shape as a whole, each individual layer may not necessarily be in the form of a layer. For example, a certain polyurethane layer may be present only on a part along the width of the belt.

The reinforcing substrate 6, 8 or 9 may be embedded in any single polyurethane layer, or may extend over a plurality of arbitrary polyurethane layers.

Each of the belts shown in FIGS. 4 to 9 includes the inner polyurethane layer 10, 12, 14, 16, 18 or 20 and the outer polyurethane layer 11, 13, 15, 17, 19 or 21.

The inner polyurethane layer 10, 12, 14, 16, 18 or 20 is made of a composition containing a urethane prepolymer having isocyanate groups (NCO) on ends and a hardener having active hydrogen groups (H) on ends, similarly to the outer polyurethane layer (the said polyurethane layer forming the outer peripheral surface) 11, 13, 15, 17, 19 or 21. The urethane prepolymer is obtained by reacting polyol and a phenylene isocyanate derivative with each other.

The polyol and the phenylene isocyanate derivative for obtaining the urethane prepolymer for the inner polyurethane layer 10, 12, 14, 16, 18 or 20 are similar to those described with reference to the outer polyurethane layer (the said polyurethane layer forming the outer peripheral surface) 11, 13, 15, 17, 19 or 21. One of or a mixture of at least two of polyol, aromatic diol and aromatic diamine hardeners generally employable as hardeners for polyurethane can be employed as the hardener for the inner polyurethane layer 10, 12, 14, 16, 18 or 20.

In the composition forming the inner polyurethane layer 10, 12, 14, 16, 18 or 20, the urethane prepolymer and the hardener are mixed with each other in a ratio setting the equivalent ratio (H/NCO) between the active hydrogen groups (H) of the hardener and the isocyanate groups (NCO) of the urethane prepolymer to $0.85 \leq H/NCO < 1$. In the composition forming the inner polyurethane layer 10, 12, 14, 16, 18 or 20, the urethane prepolymer and the hardener can also be mixed with each other in a ratio setting the value of the equivalent ratio (H/NCO) to $0.85 \leq H/NCO \leq 0.99$.

In the composition forming the outer polyurethane layer 11, 13, 15, 17, 19 or 21, on the other hand, the urethane prepolymer and the hardener are mixed with each other in a ratio setting the value of the equivalent ratio (H/NCO) between the active hydrogen groups (H) of the hardener and the isocyanate groups (NCO) of the urethane prepolymer to $1 < H/NCO < 1.15$. The urethane prepolymer and the hardener are preferably mixed with each other in a ratio setting the value of the equivalent ratio (H/NCO) to $1.01 \leq H/NCO \leq 1.14$.

When the mixing ratio for the hardener and the urethane prepolymer is set to $0.85 \leq H/NCO < 1$ for the inner polyurethane layer 10, 12, 14, 16, 18 or 20 and set to $1 < H/NCO < 1.15$ for the outer polyurethane layer 11, 13, 15, 17, 19 or 21, adhesion between the inner polyurethane layer 10, 12, 14, 16, 18 or 20 and the outer polyurethane layer 11, 13, 15, 17, 19 or 21 is improved and delamination can be suppressed. The reason for this is conceivably because the equivalent ratio for the inner polyurethane layer 10, 12, 14, 16, 18 or 20 is set to $0.85 \leq H/NCO < 1$ so that NCO groups stoichiometrically remain and these residual isocyanate groups (NCO) react with surplus active hydrogen groups (H) of the outer polyurethane layer 11, 13, 15, 17, 19 or 21 having the equivalent ratio set to $1 < H/NCO < 1.15$, to strongly adhere to and integrate with the same. When the mixing ratio of the hardener and the urethane prepolymer is set to $0.85 \leq H/NCO \leq 0.99$ for the inner polyurethane layer 10, 12, 14, 16, 18 or 20 and to $1.01 \leq H/NCO \leq 1.14$ for the outer polyurethane layer, 11, 13, 15, 17, 19 or 21, delamination can be more preferably suppressed.

In the belt shown in FIG. 5, the fabric base 6 is impregnated and covered with two polyurethane layers from both surfaces, to be integrated therewith. The adhesive surface between the inner polyurethane layer 12 and the outer polyurethane layer 13 is present in the fabric base 6. Therefore, an anchor effect is attained between the fabric base 6 and the polyurethane layers 12 and 13 in addition to the adhesion, whereby strong adhesion is attained so that the belt can be prevented from delamination.

As a preferred mode of the belt shown in FIG. 5, the urethane prepolymer forming the inner polyurethane layer 12 contains an MDI urethane prepolymer obtained by reacting polyol and diphenylmethane diisocyanate (MDI) with each other while the urethane prepolymer forming the outer polyurethane layer 13 contains a TDI urethane prepolymer obtained by reacting polyol and tolylene diisocyanate (TDI) with each other.

The polyurethane using the MID prepolymer relatively quickly reacts and has a short hardening time. Therefore, the prepolymer forming the inner polyurethane layer 12 is mainly composed of the MDI prepolymer so that the polyurethane layer 12 can be prevented from passing through the fabric base 6 toward the opposite surface when the fabric base 6 is coated with the inner polyurethane layer 12 and the position of impregnation can be stopped in the fabric base 6 in the stage of manufacturing the belt. On the other hand, the polyurethane using the TDI prepolymer relatively slowly reacts and has a long hardening time. Therefore, the prepolymer forming the outer polyurethane layer 13 is mainly composed of the TDI prepolymer so that the outer polyurethane layer 13 can be sufficiently infiltrated into the position impregnated with the inner polyurethane layer 12. Thus, the adhesive surface between the inner polyurethane layer 12 and the outer polyurethane layer 13 can be formed in the fabric base 6.

In the inner polyurethane layer 12, polyol preferably occupies at least 50 wt. % of the hardener with respect to the MDI urethane prepolymer. In this case, the hardening time of the polyurethane can be readily adjusted for adjusting the position for impregnating the fabric base 6. A polyol hardener is selected from polyether polyol and polyester polyol. Polyethylene glycol (PEG), polypropylene glycol (PPG), polytetramethylene glycol (PTMG) or the like can be listed as polyether polyol, for example. Polycaprolactone ester, polycarbonate, polyethylene adipate, polybutylene adipate, polyhexene adipate or the like can be listed as polyester polyol. These can be individually employed or at least two of these can be mixed or polymerized with each other, and a modified body thereof can also be employed. The hardener for the inner polyurethane layer 12 may contain at least 50 wt. % of polyol, and may be mixed with one or at least two types of aromatic diol or aromatic diamine hardeners.

Figure 11:
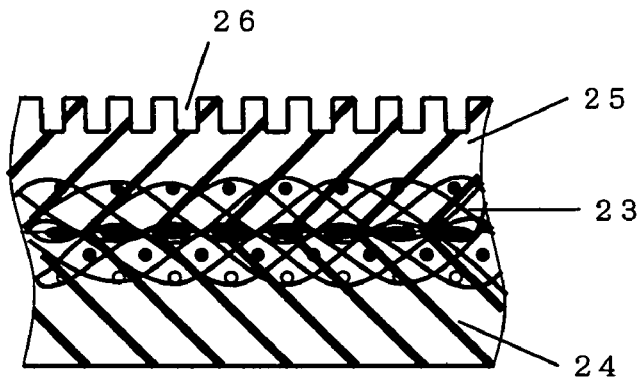
FIG. 11 is a local sectional view showing a further exemplary papermaking belt according to the present invention.

FIG. 11 shows a more preferred mode of the belt shown in FIG. 5. The belt shown in FIG. 11 employs a fabric base 23 consisting of multi-woven fabric in the belt shown in FIG. 5. This fabric base 23 preferably includes a number of voids, in order to improve the degree of impregnation of polyurethane. When the multi-woven fabric base 23 is employed, the following effects can be attained in addition to the excellent strength of the fabric base 23 itself: When the fabric base 23 consisting of multi-woven fabric is employed, polyurethane can sufficiently infiltrate into the fabric base 23 for forming an adhesive surface between an inner polyurethane layer 24 and an outer polyurethane layer 25 in the fabric base 23. Further, a sufficient anchor effect can be attained between the polyurethane layers 24 and 25 and the fabric base 23. Therefore, strong adhesion is attained between the inner polyurethane layer 24 and the outer polyurethane layer 25, for preventing the belt from delamination. Quadruple layer weaving, triple layer weaving or the like can be listed as exemplary multi-weaving. Polyurethane used for the belt shown in FIG. 11 is similar to that shown in FIG. 5. On the outer peripheral surface of the belt shown in FIG. 11, a number of grooves 26 are formed along the traveling direction in order to improve dehydration efficiency.

In each of the belts shown in FIGS. 4 to 9 and 11, the outer polyurethane layer 11, 13, 15, 17, 19, 21 or 25 adheres to the outer peripheral surface of the inner polyurethane layer 10, 12, 14, 16, 18, 20 or 24, and forms the outer peripheral surface of the papermaking belt. In this belt, the outer polyurethane layer 11, 13, 15, 17, 19, 21 or 25 is preferably made of a composition containing a urethane prepolymer having isocyanate groups on ends and a hardener mainly composed of dimethylthiotoluenediamine as described above. When the hardener for the outer polyurethane layer 11, 13, 15, 17, 19, 21 or 25 including the outer peripheral surface is mainly composed of dimethylthiotoluenediamine, the outer peripheral surface of the belt can be inhibited from cracking as described above.

In each of the belts shown in FIGS. 4 to 9 and 11, as hereinabove described, the urethane prepolymer and the hardener are mixed with each other in the ratio setting the value of the equivalent ratio (H/NCO) between the active hydrogen groups (H) of the hardener and the isocyanate groups (NCO) of the urethane prepolymer to 1<H/NCO<1.15 in the composition forming the outer polyurethane layer 11, 13, 15, 17, 19, 21 or 25 including the outer peripheral surface. Even if a small crack occurs in the polyurethane layer 11, 13, 15, 17, 19, 21 or 25 forming the outer peripheral surface of the belt, therefore, the crack can be inhibited from growing into a large crack. Even if a small crack occurs, the crack can be more accurately prevented from growing into a large crack when the urethane prepolymer and the hardener are mixed with each other in a ratio setting the value of the equivalent ratio (H/NCO) to $1.01 \leq H/NCO \leq 1.14$.

Figure 12:
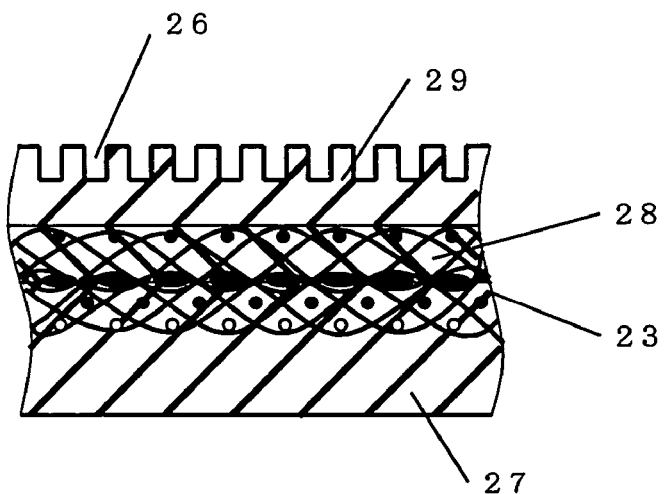
FIG. 12 is a local sectional view showing a further exemplary papermaking belt according to the present invention.

FIG. 12 shows another embodiment. In a belt shown in FIG. 12, a fabric base consisting of multi-woven fabric is impregnated and covered with an inner polyurethane layer 27 and an outer polyurethane layer 28 from both surfaces, and the outer polyurethane layer 28 is further covered and integrated with a polyurethane layer 29 forming an outer peripheral surface. The adhesive surface between the inner polyurethane layer 27 and the outer polyurethane layer 28 is present in the fabric base 23. One or a plurality of polyurethane layers may further be formed between the outer polyurethane layer 28 and the polyurethane layer 29 forming the outer peripheral surface. In the example shown in FIG. 12, the position of the interface between the outer polyurethane layer 28 and the polyurethane layer 29 forming the outer peripheral surface is flush with the surface of the fabric base 23. However, the position of the interface between the outer polyurethane layer 28 and the polyurethane layer 29 forming the outer peripheral surface is not restricted to this but may vertically deviate from the surface of the fabric base 23. Also on the outer peripheral surface of the belt shown in FIG. 12, a number of grooves 26 are formed along the traveling direction for improving dehydration efficiency.

In the belt shown in FIG. 12, the polyurethane layer 29 forming the outer peripheral surface is made of a composition containing a urethane prepolymer having isocyanate groups on ends and a hardener mainly composed of dimethylthiotoluenediamine. Also in this example, the outer peripheral surface of the belt can be inhibited from cracking by preparing the main component of the hardener for the polyurethane layer 29 forming the outer peripheral surface from dimethylthiotoluenediamine, as hereinabove described.

In the belt shown in FIG. 12, the polyurethane layer 29 forming the outer peripheral surface is preferably prepared by mixing the urethane prepolymer and the hardener with each other in the ratio setting the value of the equivalent ratio (H/NCO) between the active hydrogen groups (H) of the hardener and the isocyanate groups (NCO) of the urethane prepolymer to 1<H/NCO<1.15. Even if a small crack occurs in the polyurethane layer 29 forming the outer peripheral surface of the belt, the crack can be inhibited from growing into a large crack due to this structure. The urethane prepolymer and the hardener are more preferably mixed with each other in a ratio setting the value of the equivalent ratio (H/NCO) to $1.01 \leq H/NCO \leq 1.14$.

The belt shown in FIG. 12 can be provided as a belt containing no bubbles causing breakage or delamination due to the presence of the outer polyurethane layer 28 between the inner polyurethane layer 27 and the polyurethane layer 29 forming the outer peripheral surface.

In order to manufacture the belt, the fabric base 23 is first turned inside out. The surface defining the back surface of the fabric base 23 is coated with the inner polyurethane layer 27 for infiltrating polyurethane into an intermediate portion of the fabric base 23. Then, the fabric base 23 is reversed and coated with the outer polyurethane layer 28 to fill up the remaining portion of the fabric base 23 from the surface. The outer polyurethane layer 28 is further coated with the polyurethane layer 29 forming the outer peripheral surface. Thus, air remaining in the fabric base 23 can be expelled when the same is coated with the outer polyurethane layer 28. Therefore, a belt containing no bubbles can be obtained.

In the belt shown in FIG. 12, the outer polyurethane layer 28 may be made of the same composition as the inner polyurethane layer 27 or the polyurethane layer 29 forming the outer peripheral surface, or may be made of another composition.

While the example shown in FIG. 12 includes three polyurethane layers, i.e., the inner polyurethane layer 27, the outer polyurethane layer 28 and the polyurethane layer 29 forming the outer peripheral surface, the number of such polyurethane layers may be only one, two or at least four. When the outer polyurethane layer 28 is divided into a plurality of thin layers for coating the fabric base 23, for example, air contained in the fabric base 23 can be more effectively expelled. The fabric base 23 can also be coated with the inner polyurethane layer 27 a plurality of times.

Throughout the present invention, polyurethane is preferably hardened at a temperature of 120° C. to 140° C. Thus, crack resistance as well as crack propagation resistance of the belt are improved.

A method of manufacturing the belt shown in FIG. 11 is now described. As a first step, the fabric base 23 consisting of endless multi-woven fabric is turned inside out. The surface defining the back surface of the fabric base is coated with the inner polyurethane layer 24 for infiltrating polyurethane into an intermediate portion of the fabric base 23. This polyurethane is a liquid mixture, containing a urethane prepolymer having isocyanate groups on ends and a hardener having active hydrogen groups on ends, prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to $0.85 \leq H/NCO < 1$. The liquid mixture is preferably prepared by mixing the urethane prepolymer and the hardener with each other in a ratio setting the value of the equivalent ratio (H/NCO) to $0.85 \leq H/NCO \leq 0.99$. The polyurethane forming the coat is hardened at a temperature of 70° C. to 100° C.

Then, the fabric base 23 is reversed and coated with the outer polyurethane layer 25 from the surface side to fill up the remaining portion of the fabric base 23 as a second step. This polyurethane is a liquid mixture, containing a urethane prepolymer having isocyanate groups on ends and a hardener having active hydrogen groups on ends, prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to $1 < H/NCO < 1.15$. The liquid mixture is preferably prepared by mixing the urethane prepolymer and the hardener with each other in a ratio setting the value of the equivalent ratio (H/NCO) to $1.01 \leq H/NCO \leq 1.14$.

Then, the whole is heated to a temperature of 120° C. to 140° C. for hardening the liquid mixture applied onto the outer peripheral surface of the inner polyurethane layer 24 and forming the outer polyurethane layer 25 while bonding and integrating the inner polyurethane layer 24 and the outer polyurethane layer 25 to and with each other as a third step.

The belt shown in FIG. 11 can be obtained by thereafter forming the number of grooves 26 on the outer peripheral surface of the belt along the traveling direction.

According to this method, polyurethane having the composition of $0.85 \leq H/NCO < 1$ stoichiometrically containing remaining NCO groups is semi-hardened at the relatively low temperature of 70° C. to 100° C. in the first step. In the second step, the semi-hardened inner polyurethane layer 24 is coated with the outer polyurethane layer 25 having the composition of $1 < H/NCO < 1.15$ containing the hardener in a large quantity. Then, the whole is heated to the relatively high temperature of 120° C. to 140° C. and hardened in the third step. Therefore, the adhesion between the inner polyurethane layer 24 and the outer polyurethane layer 25 is improved so that delamination can be suppressed.

The fabric base 23 consisting of multi-woven fabric forms the reinforcing substrate, whereby the adhesive surface between the inner polyurethane layer 24 and the outer polyurethane layer 25 can be readily located in the fabric base 23. In addition to the adhesion, an anchor effect can be attained between the fabric base 23 and the polyurethane layers 24 and 25 due to the adhesive surface located in the fabric base 23. Therefore, strong adhesion can be attained and the belt can be prevented from delamination.

When employing an open weave fabric base capable of sufficiently passing liquid polyurethane therethrough or the yarns 8 and 9 shown in FIG. 8 for the reinforcing substrate in place of the multi-woven fabric base 23 as a modification of the aforementioned manufacturing method, the belt can be manufactured as follows: Describing the manufacturing method with reference to the belt shown in FIG. 8, a mandrel is coated with a liquid mixture containing a urethane prepolymer having isocyanate groups on ends and a hardener having active hydrogen groups on ends prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to $0.85 \leq H/NCO < 1$ and the liquid mixture is hardened at a temperature of 70° C. to 100° C. for forming the inner polyurethane layer 18. The urethane prepolymer and the hardener are more preferably mixed with each other in a ratio setting the value of the equivalent ratio (H/NCO) to $0.85 \leq H/NCO \leq 0.99$. Then, the yarn 9 in the CMD and the yarn 8 in the MD are wound on the outer peripheral surface of the inner polyurethane layer as reinforcing substrates. As a second step, the reinforcing substrates 8 and 9 are coated with a liquid mixture containing a urethane prepolymer having isocyanate groups on ends and a hardener having active hydrogen groups on ends, prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to $1 < H/NCO < 1.15$. The liquid mixture is more preferably prepared by mixing the urethane prepolymer and the hardener with each other in a ratio setting the value of the equivalent ratio (H/NCO) to $1.01 \leqq H/NCO \leqq 1.14$. Then, the whole is heated to a temperature of 120° C. to 140° C. for hardening the liquid mixture applied onto the outer peripheral surface of the inner polyurethane layer 18 and forming the outer polyurethane layer 19 while bonding and integrating the inner polyurethane layer 18 and the outer polyurethane layer 19 to and with each other as a third step.

In order to manufacture the belt shown in FIG. 12, a step of further coating the outer polyurethane layer 28 with the polyurethane layer 29 forming the outer peripheral surface may be added between the second and third steps in the aforementioned method of manufacturing the belt shown in FIG. 11.

While the above description has been made with reference to a belt for shoe pressing, the present invention is also applicable to a calender belt and a sheet transfer belt. The calender belt and the sheet transfer belt are not formed with grooves on the surfaces thereof in general.

EXAMPLE

Figure 13:
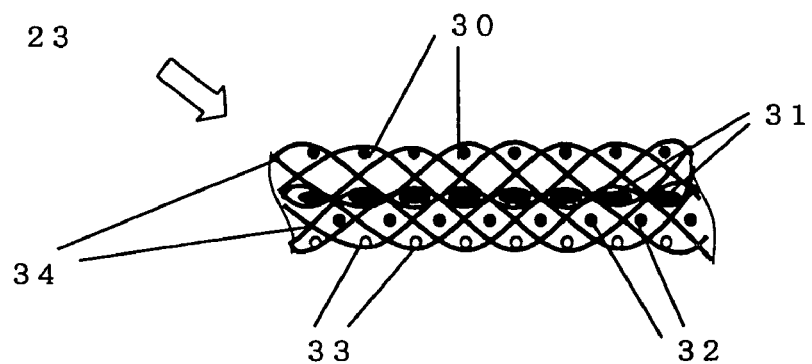
FIG. 13 is a local sectional view showing the structure of a fabric base used for Example of the present invention.

As Example, the papermaking belt shown in FIG. 12 was manufactured in the following procedure: An endless fabric base 23 consisting of quadruple layer woven fabric was prepared as the reinforcing substrate. This fabric base was 2.3 mm in thickness, and contained voids. As to the structure of the fabric base, warps of the MD consisted of four layers of polyester monofilaments 30 of 0.35 mm in diameter, polyester multifilaments 31 of 3000 d, polyester monofilaments 32 of 0.35 mm in diameter and nylon monofilaments 33 of 0.35 mm in diameter successively from the surface side and wefts of the CMD consisted of polyester monofilaments 34 of 0.40 mm in diameter, as shown in FIG. 13. The number of the warps was 68/inch, and the number of the wefts was 56/inch.

As the material for the inner polyurethane layer 27, 100 parts by weight of a urethane prepolymer (PTMG/MDI: NCO %=5%) and 27.4 parts by weight of a hardener (prepared by blending PTMG and ETHACURE 300 in a ratio of 65/35: equivalent=250) were individually defoamed and thereafter mixed with each other (H/NCO=0.92). The term NCO % stands for the weight percentage of the isocyanate groups contained in the urethane prepolymer. The surface of the fabric base 23 turned inside out was coated with this mixture, which in turn was heated under a temperature condition of 80° C. for 10 hours. The fabric base 23 was impregnated with the inner polyurethane layer 27 up to 50% of the thickness.

Then, the polyurethane layer 27 coating the fabric base 23 was cut and ground so that the thickness from the surface of the fabric base 23 was 1.0 mm. Thereafter the fabric base 23 was reversed to direct the coated surface inward.

Then, 100 parts by weight of a urethane prepolymer (PTMG/TDI: NCO %=5%) and 13.8 parts by weight of a hardener (ETHACURE 300: equivalent=107) were individually defoamed and thereafter mixed with each other as the material for forming the outer polyurethane layer 28, for coating the other surface of the fabric base 23 with this mixture while impregnating the same with the mixture up to the surface impregnated with the inner polyurethane layer 27. The coated surface was smoothed with a doctor blade to be substantially flush with the position of the surface of the fabric base 23.

Further, the outer polyurethane layer 28 was coated with the same material as the said outer polyurethane layer 28 as the polyurethane layer 29 forming the outer peripheral surface. Thereafter heating was performed under a temperature condition of 120° C. for 16 hours for bonding and integrating the inner polyurethane layer 27, the outer polyurethane layer 28, the polyurethane layer 29 forming the outer peripheral surface and the fabric base 23 to and with each other.

Further, the surface of the belt was cut and ground so that the thickness of the polyurethane layer 29 forming the outer peripheral surface was 1.5 mm. In addition, a number of grooves 26 were formed on the outer surface of the belt along the traveling direction at a groove width of 0.8 mm, a depth of 0.8 mm and a pitch of 2.54 mm. The total thickness and the JIS-A surface hardness of the obtained belt were 4.8 mm and 90° respectively.

Figure 14:
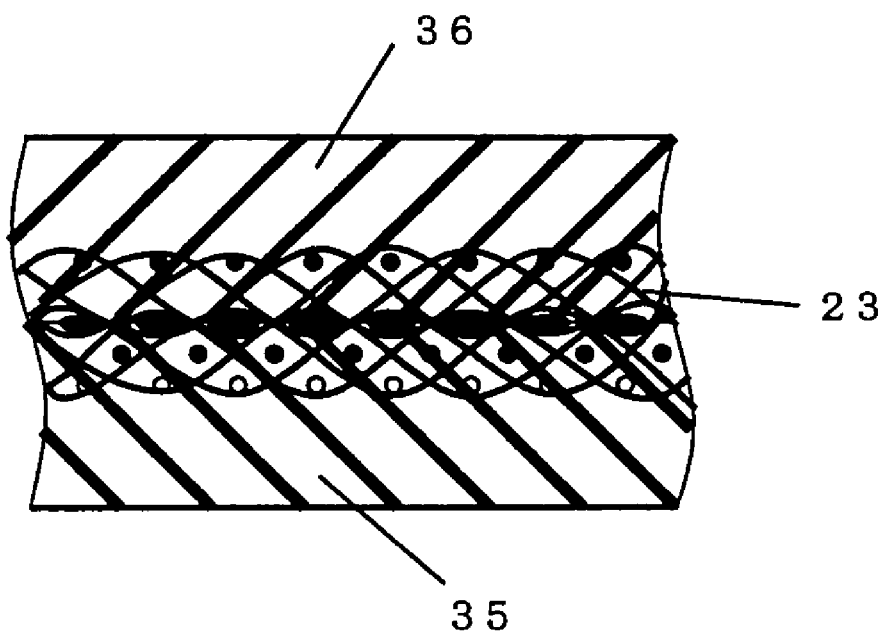
FIG. 14 is a local sectional view showing the structure of a sample used for a comparative experiment of the present invention.

Then, samples 1 to 6 each having a structure shown in FIG. 14 were prepared as follows: A fabric base 23 consisting of quadruple layer woven fabric identical to that employed for the aforementioned fabric base was prepared as the reinforcing substrate. As a polyurethane layer 35 forming an inner surface, 100 parts by weight of a urethane prepolymer (PTMG/MDI: NCO %=5%) and 27.4 parts by weight of a hardener (obtained by blending PTMG and ETHACURE 300 in a ratio of 65/35: equivalent=250) were individually defoamed and thereafter mixed with each other (H/NCO=0.92). The back surface of the fabric base 23 was coated with this mixture, which in turn was heated under a temperature condition of 80° C. for 10 hours. The fabric base 23 was impregnated with the polyurethane layer 35 forming the inner surface up to 50% of the thickness. Then, the polyurethane layer 35 coating the fabric base 23 was cut and ground so that the thickness from the surface of the fabric base 23 was 1.0 mm.

Then, urethane prepolymers HIPRENE L-100 and HIPRENE L-167 (each PTMG/TDI prepolymer: by Mitsui Chemicals) and hardeners ETHACURE 300 and MOCA were used as the materials for a polyurethane layer 36 forming an outer surface. Each urethane prepolymer and each hardener were individually defoamed and thereafter mixed with each other in each composition shown in Table 1, and the fabric base 23 was impregnated and coated with the mixture up to the surface impregnated with the polyurethane layer 35 forming the inner surface from a surface defining the outer surface of the fabric base 23.

Thereafter heating was performed under a temperature condition of 120° C. for 16 hours, for bonding and integrating the polyurethane layer 35 forming the inner surface, the polyurethane layer 36 forming the outer surface and the fabric base 23 to and with each other. Further, the surface of the belt was cut and ground so that the thickness of the polyurethane layer 36 forming the outer surface from the surface of the fabric base 23 was 1.5 mm, for obtaining each of the samples 1 to 6.

Figure 15:
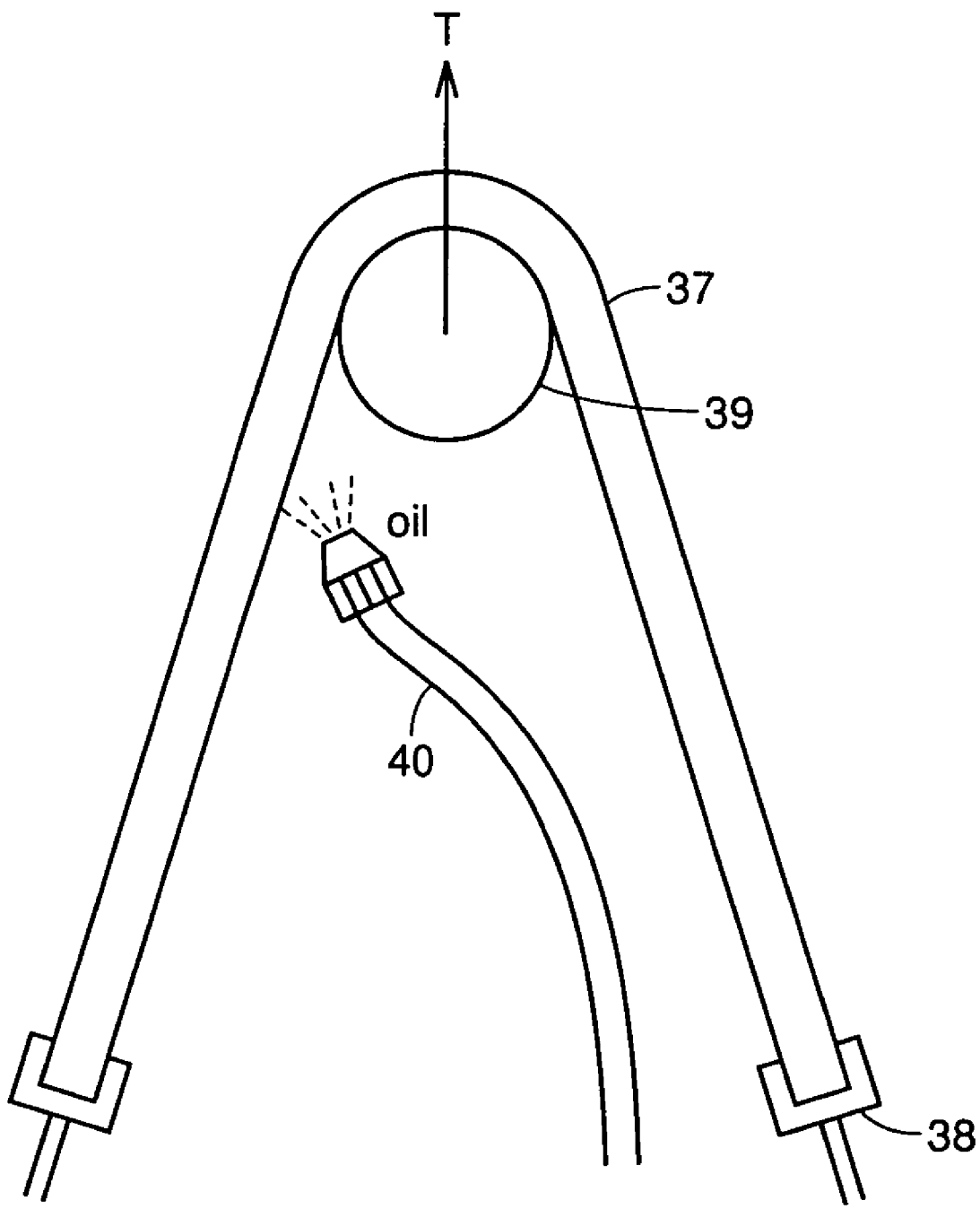
FIG. 15 a diagram illustrating a test apparatus for crack resistance.

A test piece of 20 mm in width and 420 mm in length was obtained from each of the samples 1 to 6. As shown in FIG. 15, both longitudinal ends of each test piece 37 were gripped with gripping members 38 for bringing a metal round bar 39 of 25 mm in diameter having a smooth surface into contact with the inner side of an intermediate portion and applying tension T. The tension T was set to 9.8 kN/m. The test piece 37 was repetitively reciprocated with a width of 10 cm while keeping the tension T and supplying lubricating oil between the inner surface of the test piece 37 and the round bar 39 from a nozzle 40. According to this method, sliding was repeated between the inner surface and the round bar 39 while applying the tension T to the test piece 37. The number of times of reciprocation up to cracking on the surface of the test piece 37 was measured as an endurance limit. Table 1 shows the results. Table 1 also shows the hardness of each of the samples 1 to 6. Referring to Table 1, the quantity of the hardener indicates the number of parts by weight of the hardener with respect to 100 parts by weight of the prepolymer.

TABLE 1

| | Polyurethane forming Outer Surface | | | | | | Equivalent Ratio | Hardness | Endurance Limit (× ten thousand |
|---|---|---|---|---|---|---|---|---|---|
| | Prepolymer | | | Hardener | | | | | |
| | L-100 | L-167 | NCO % | Type | Quantity | Equivalent | (H/NCO) | (JIS A) | times) |
| Sample 1 | 100 | 0 | 4.2 | DMTDA | 11.1 | 107 | 1.04 | 89 | 2250 |
| Sample 2 | 50 | 50 | 5.3 | DMTDA | 14.0 | 107 | 1.04 | 91 | 750 |
| Sample 3 | 0 | 100 | 6.4 | DMTDA | 17.0 | 107 | 1.04 | 94 | 250 |
| Sample 4 | 100 | 0 | 4.2 | MOCA | 13.9 | 133.6 | 1.04 | 90 | 90 |
| Sample 5 | 50 | 50 | 5.3 | MOCA | 17.5 | 133.6 | 1.04 | 92 | 30 |
| Sample 6 | 0 | 100 | 6.4 | MOCA | 21.1 | 133.6 | 1.04 | 95 | 10 |

L-100: HIPRENE L-100 (by Mitsui Chemicals)
L-167: HIPRENE L-167 (by Mitsui Chemicals)
DMTDA: dimethylthiotoluenediamine ( [ETHACURE 300] : by ALBEMARLE Corporation)
MOCA: 4,4'-methylene-bis-(2-chloroaniline)

Each of samples 7 to 30 was prepared as follows: The reinforcing substrate 23 and the polyurethane layer 35 forming the inner surface were similar to those of the aforementioned samples 1 to 6. As to the materials for the polyurethane layer 36 forming the outer surface, L-100 and L-167 were used as the urethane prepolymers and ETHACURE 300 was used as the hardener. Each urethane prepolymer and the hardenet were individually defoamed and thereafter mixed with each other in each composition varying in H/NCO equivalent ratio as shown in Table 2, and the surface forming the outer side of the fabric base 23 was impregnated and coated with this mixture up to the surface impregnated with the polyurethane layer 35 forming the inner surface.

Thereafter heating was performed under a temperature condition of 120° C. for 16 hours, for bonding and integrating the polyurethane layer 35 forming the inner surface, the polyurethane layer 36 forming the outer surface and the fabric base 23 to and with each other. Further, the surface of the belt was cut and ground so that the thickness of the polyurethane layer 36 forming the outer surface from the surface of the fabric base 23 was 1.5 mm, for obtaining each of the samples 7 to 30.

As to each of the samples 7 to 30, crack propagation resistance was tested with a de Mattia machine defined in JIS K6260 under the following conditions: The test piece was set to 20 mm in width and 150 mm in length. Reciprocating motion was made at a maximum distance of 80.5 mm, a minimum distance of 38.5 mm and a motion distance of 42.0 mm. A notch was formed on the outer surface of an end of the test piece in the width direction at the longitudinal center with a length of 3 mm and a depth of 1.5 mm. The test piece was bent 1000 times under these conditions, for thereafter measuring the magnitude of cracking. Table 2 shows the results in the item of crack propagation length. Further, each of the samples 7 to 30 was reciprocated million times with a tester shown in FIG. 15, for visually confirming whether or not the test piece was cracked. Table 2 shows the results in the item of presence/absence of cracking. Referring to Table 2, the quantity of the hardener indicates the number of parts by weight of the hardener with respect to 100 parts by weight of the prepolymer.

TABLE 2

| | Polyurethane forming Outer Surface | | | | | | Equivalent Ratio | Hardness | Length of Progress of Cracking | Presence/Absence of Cracking (million |
|---|---|---|---|---|---|---|---|---|---|---|
| | Prepolymer | | | Hardener | | | | | | |
| | L-100 | L-167 | NCO % | Type | Quantity | Equivalent | (H/NCO) | (JIS A) | (mm/1000 bends) | reciprocations) |
| Sample 7 | 100 | 0 | 4.2 | DMTDA | 9.8 | 107 | 0.92 | 89 | 5 | no |
| Sample 8 | 100 | 0 | 4.2 | DMTDA | 10.3 | 107 | 0.96 | 89 | 2.9 | no |
| Sample 9 | 100 | 0 | 4.2 | DMTDA | 10.7 | 107 | 1 | 89 | 0.8 | no |
| Sample 10 | 100 | 0 | 4.2 | DMTDA | 10.8 | 107 | 1.01 | 89 | 0.5 | no |
| Sample 11 | 100 | 0 | 4.2 | DMTDA | 11.1 | 107 | 1.04 | 89 | 0.2 | no |
| Sample 12 | 100 | 0 | 4.2 | DMTDA | 11.6 | 107 | 1.08 | 89 | 0.01 | no |
| Sample 13 | 100 | 0 | 4.2 | DMTDA | 12.2 | 107 | 1.14 | 89 | 0.005 | no |
| Sample 14 | 100 | 0 | 4.2 | DMTDA | 12.3 | 107 | 1.15 | 89 | 0.001 | yes |
| Sample 15 | 50 | 50 | 5.3 | DMTDA | 12.4 | 107 | 0.92 | 91 | 7 | no |
| Sample 16 | 50 | 50 | 5.3 | DMTDA | 13.0 | 107 | 0.96 | 91 | 4.1 | no |
| Sample 17 | 50 | 50 | 5.3 | DMTDA | 13.5 | 107 | 1 | 91 | 1.1 | no |
| Sample 18 | 50 | 50 | 5.3 | DMTDA | 13.6 | 107 | 1.01 | 91 | 0.7 | no |
| Sample 19 | 50 | 50 | 5.3 | DMTDA | 14.0 | 107 | 1.04 | 91 | 0.4 | no |
| Sample 20 | 50 | 50 | 5.3 | DMTDA | 14.6 | 107 | 1.08 | 91 | 0.1 | no |
| Sample 21 | 50 | 50 | 5.3 | DMTDA | 15.4 | 107 | 1.14 | 91 | 0.05 | no |
| Sample 22 | 50 | 50 | 5.3 | DMTDA | 15.5 | 107 | 1.15 | 91 | 0.005 | yes |
| Sample 23 | 0 | 100 | 6.4 | DMTDA | 15.0 | 107 | 0.92 | 94 | 9 | no |
| Sample 24 | 0 | 100 | 6.4 | DMTDA | 15.7 | 107 | 0.96 | 94 | 5.1 | no |
| Sample 25 | 0 | 100 | 6.4 | DMTDA | 16.3 | 107 | 1 | 94 | 1.5 | no |
| Sample 26 | 0 | 100 | 6.4 | DMTDA | 16.5 | 107 | 1.01 | 94 | 0.9 | no |

TABLE 2-continued

| | Polyurethane forming Outer Surface | | | | | | | Length of Progress of Cracking | Presence/Absence of Cracking (million |
|---|---|---|---|---|---|---|---|---|---|
| | Prepolymer | | | Hardener | | | Equivalent Ratio | Hardness | |
| | L-100 | L-167 | NCO % | Type | Quantity | Equivalent | (H/NCO) | (JIS A) | (mm/1000 bends) | reciprocations) |
| Sample 27 | 0 | 100 | 6.4 | DMTDA | 17.0 | 107 | 1.04 | 94 | 0.6 | no |
| Sample 28 | 0 | 100 | 6.4 | DMTDA | 17.6 | 107 | 1.08 | 94 | 0.3 | no |
| Sample 29 | 0 | 100 | 6.4 | DMTDA | 18.6 | 107 | 1.14 | 94 | 0.1 | no |
| Sample 30 | 0 | 100 | 6.4 | DMTDA | 18.8 | 107 | 1.15 | 94 | 0.01 | yes |

L-100: HIPRENE L-100 (by Mitsui Chemicals)
L-167: HIPRENE L-167 (by Mitsui Chemicals)
DMTDA: dimethylthiotoluenediamine ( [ETHACURE 300] : by ALBEMARLE Corporation)

As understood from Table 2, it was possible to suppress the crack propagation length to less than 1 mm in each sample having the equivalent ratio (H/NCO) in the polyurethane layer forming the outer surface greater than 1. The crack propagation length can be suppressed as the equivalent ratio (H/NCO) is increased. When the equivalent ratio (H/NCO) was increased to 1.15, however, cracking was observed in the million-reciprocation test.

Then, the equivalent ratio (H/NCO) in the polyurethane layer forming the inner surface was varied for preparing each of samples 31 to 36 having the structure shown in FIG. 14 as follows: The reinforcing substrate 23 was identical to those of the samples 1 to 30. The polyurethane layer 36 forming the outer surface was prepared by employing L-167 as the urethane prepolymer and ETHACURE 300 as the hardener in the same mixing ratio as the aforementioned sample 27. As to the polyurethane layer 35 forming the inner surface, the same materials as those employed for the aforementioned sample 27, i.e., the urethane prepolymer (PTMG/MDI: NCO %=5%) and the hardener (prepared by mixing PTMG and ETHACURE 300 in the ratio of 65/35: equivalent=250) were employed. However, the mixing ratio of the urethane prepolymer and the hardener for the polyurethane layer 35 forming the inner surface was varied for preparing the samples 31 to 36. The remaining manufacturing conditions and the thicknesses of the respective layers were set identically to the samples 1 to 30.

A test piece of 20 mm in width and 420 mm in length was prepared from each of the samples 31 to 36, and subjected to a durability test with the tester shown in FIG. 15 similarly to the samples 1 to 6. Evaluation was made by confirming a state after reciprocation for 2.5 million times as to each sample. Table 3 shows the results. Referring to Table 3, the prepolymers and the hardeners are shown in parts by weight.

TABLE 3

| | Polyurethane forming Inner Surface | | | Polyurethane forming Outer Surface | | | |
|---|---|---|---|---|---|---|---|
| | Prepolymer ※1 | Hardener ※2 | Equivalent Ratio (H/NCO) | Prepolymer ※3 | Hardener ※4 | Equivalent Ratio (H/NCO) | State of Sample (2.5 million times) |
| Sample 31 | 100 | 30.4 | 1.02 | 100 | 17.0 | 1.04 | boundary between layers impregnated with resin separated |
| Sample 32 | 100 | 29.8 | 1.00 | 100 | 17.0 | 1.04 | boundary between layers impregnated with resin partially separated |
| Sample 33 | 100 | 29.2 | 0.98 | 100 | 17.0 | 1.04 | no problem |
| Sample 34 | 100 | 27.4 | 0.92 | 100 | 17.0 | 1.04 | no problem |
| Sample 35 | 100 | 25.3 | 0.85 | 100 | 17.0 | 1.04 | no problem |
| Sample 36 | 100 | 23.8 | 0.80 | 100 | 17.0 | 1.04 | polyurethane layer forming inner surface slightly cracked |

※1 PTMG/MDI: NCO % = 5%
※2 PTMG/ETHACURE 300 = 65/35: Equivalent = 250
※3 HIPRENE L-167 (PTMG/TDI): NCO % = 6.4%
※4 ETHACURE 300: Equivalent = 107

When the equivalent ratio H/NCO in the polyurethane layer forming the inner surface was less than 0.85, the strength of the polyurethane layer forming the inner surface was reduced to result in small cracks. When the equivalent ratio H/NCO in the polyurethane layer forming the inner surface exceeded 1, delamination was caused.

The equivalent ratio H/NCO in the polyurethane layer forming the outer surface is preferably set to 1<H/NCO<1.15. According to each of the samples 7 to 30 shown in Table 2, cracking readily spreads if the equivalent ratio H/NCO in the polyurethane layer forming the outer surface is not more than 1, while cracking readily occurs if the equivalent ratio is in excess of 1.15.

The embodiment and Example disclosed this time must be considered illustrative in all points and not restrictive. The scope of the present invention is shown not by the above description but by the scope of claim for patent, and it is intended that all modifications in the meaning and range equivalent to the scope of claim for patent are included.

INDUSTRIAL APPLICABILITY

The papermaking belt according to the present invention, having the polyurethane layer forming the outer peripheral surface made of the composition containing the urethane prepolymer having isocyanate groups on ends and the hardener containing dimethylthiotoluenediamine, can prevent cracking. Further, the papermaking belt according to the present invention, having the polyurethane layer forming the outer peripheral surface made of the composition containing the urethane prepolymer having isocyanate groups on ends and the hardener having active hydrogen groups on ends with the said composition prepared by mixing the said urethane prepolymer and the said hardener with each other in the ratio setting the value of the equivalent ratio (H/NCO) between the active hydrogen groups (H) of the said hardener and the isocyanate groups (NCO) of the said urethane prepolymer to 1<H/NCO<1.15, whereby, even if a crack occurs in the papermaking belt, this crack can be inhibited from growing. In the papermaking belt according to the present invention, the composition forming the inner polyurethane layer is prepared by mixing the urethane prepolymer and the hardener with each other in the ratio setting the equivalent ratio (H/NCO) between the active hydrogen groups (H) of the hardener and the isocyanate groups (NCO) of the urethane prepolymer to $0.85 \leq H/NCO<1$ and the composition forming the outer polyurethane layer is prepared by mixing the urethane prepolymer and the hardener with each other in the ratio setting the value of the equivalent ratio (H/NCO) to 1<H/NCO<1.15, whereby delamination can be suppressed between the reinforcing substrate and the polyurethane layers.

The invention claimed is:

1. A papermaking belt comprising a reinforcing substrate embedded in a thermosetting polyurethane layer including an inner polyurethane layer and an outer polyurethane layer adhering to an outer peripheral surface of said inner polyurethane layer, wherein
the polyurethane layer forming the outer peripheral surface being made of a composition containing a urethane prepolymer having isocyanate groups on the ends thereof and a hardener containing dimethylthiotoluenediamine, said urethane prepolymer and said hardener being mixed with each other in a ratio setting the value of the equivalent ratio (H/NCO) between active hydrogen groups (H) of said hardener and the isocyanate groups (NCO) of said urethane prepolymer to 1<H/NCO<1.15.

2. The papermaking belt according to claim 1, wherein said polyurethane layer is hardened at a temperature of 120° C. to 140° C.

3. The papermaking belt according to claim 1, provided with grooves on the outer peripheral surface thereof.

4. A papermaking belt comprising a reinforcing substrate embedded in a thermosetting polyurethane layer including an inner polyurethane layer and an outer polyurethane layer adhering to an outer peripheral surface of said inner polyurethane layer, wherein
the polyurethane layer forming said outer peripheral surface is made of a composition containing a urethane prepolymer having isocyanate groups on the ends thereof and a hardener having active hydrogen groups on the ends thereof, said urethane prepolymer and said hardener are mixed with each other in a ratio setting the value of the equivalent ratio (H/NCO) between the active hydrogen groups (H) of said hardener and the isocyanate groups (NCO) of said urethane prepolymer to 1<H/NCO<1.15.

5. A papermaking belt comprising a reinforcing substrate embedded in a thermosetting polyurethane layer, said thermosetting polyurethane layer including an inner polyurethane layer and an outer polyurethane layer adhering to the outer peripheral surface of said inner polyurethane layer, wherein
each of said inner polyurethane layer and said outer polyurethane layer being made of a composition containing a urethane prepolymer having isocyanate groups on the ends thereof and a hardener having active hydrogen groups on the ends thereof,
the composition forming said inner polyurethane layer being prepared by mixing the urethane prepolymer and the hardener with each other in a ratio setting the equivalent ratio (H/NCO) between the active hydrogen groups (H) of the hardener and the isocyanate groups (NCO) of the urethane prepolymer to $0.85 \leq H/NCO<1$, and
the composition forming said outer polyurethane layer being prepared by mixing the urethane prepolymer and the hardener with each other in a ratio setting the value of said equivalent ratio (H/NCO) to 1<H/NCO<1.15.

6. The papermaking belt according to claim 5, wherein the adhesive surface between said inner polyurethane layer and said outer polyurethane layer is present in said reinforcing substrate,
the urethane prepolymer forming said inner polyurethane layer contains a urethane prepolymer obtained by reacting polyol and diphenyl methane diisocyanate (MDI) with each other, and
the urethane prepolymer forming said outer polyurethane layer containing a urethane prepolymer obtained by reacting polyol and tolylene diisocyanate (TDI) with each other.

7. The papermaking belt according to claim 6, wherein at least 50 wt. % of the hardener forming said inner polyurethane layer is polyol.

8. The papermaking belt according to claim 6, wherein said reinforcing substrate contains multi-woven fabric.

9. The papermaking belt according to claim 5, wherein said outer polyurethane layer adheres to the outer peripheral surface of said inner polyurethane layer and forms the outer peripheral surface of the papermaking belt, and
is made of a composition containing a urethane prepolymer having isocyanate groups on the ends thereof and a hardener containing dimethylthiotoluenediamine.

10. The papermaking belt according to claim 5, wherein said thermosetting polyurethane layer includes an inner polyurethane layer, an outer polyurethane layer adhering to the outer peripheral surface of said inner polyurethane layer and a polyurethane layer located on the outer side of said outer polyurethane layer for forming the outer peripheral surface of the papermaking belt, and
said polyurethane layer forming the outer peripheral surface is made of a composition containing a urethane prepolymer having isocyanate groups on the ends thereof and a hardener containing dimethylthiotoluenediamine.

11. The papermaking belt according to claim 10, wherein the composition of said polyurethane layer forming the outer peripheral surface is prepared by mixing said urethane prepolymer and said hardener with each other in a ratio setting the value of the equivalent ratio (H/NCO) between the active hydrogen groups (H) of said hardener and the isocyanate groups (NCO) of said urethane prepolymer to 1<H/NCO<1.15.

12. A method of manufacturing a papermaking belt including an inner polyurethane layer and an outer polyurethane layer adhering to the outer peripheral surface of said inner polyurethane layer which comprises embedding a reinforcing substrate in a thermosetting polyurethane layer thereby integrating said reinforcing substrate and said thermosetting polyurethane layer with each other, including:
- a first step of hardening a liquid mixture, containing a urethane prepolymer having isocyanate groups on the ends thereof and a hardener having active hydrogen groups on the ends thereof, prepared by mixing the urethane prepolymer and the hardener with each other in a ratio setting the value of the equivalent ratio (H/NCO) between the active hydrogen groups (H) of the hardener and the isocyanate groups (NCO) of the urethane prepolymer to $0.85 \leq H/NCO < 1$ at a temperature of 70° C. to 100° C. for forming said inner polyurethane layer;
- a second step of applying a liquid mixture, containing a urethane prepolymer having isocyanate groups on the ends thereof and a hardener having active hydrogen groups on the ends thereof, prepared by mixing the urethane prepolymer and the hardener with each other in a ratio, setting the value of the equivalent ratio (H/NCO) between the active hydrogen groups (H) of the hardener and the isocyanate groups (NCO) of the urethane prepolymer to $1 < H/NCO < 1.15$ onto the outer peripheral surface of said inner polyurethane layer; and
- a third step of heating the whole to a temperature of 120° C. to 140° C. for hardening the liquid mixture applied onto the outer peripheral surface of the inner polyurethane layer and forming the outer polyurethane layer while bonding and integrating the inner polyurethane layer and the outer polyurethane layer to and with each other.

13. The method of manufacturing a papermaking belt according to claim 12, wherein said reinforcing substrate is impregnated with said inner polyurethane layer from one surface side of said reinforcing substrate to an intermediate portion of the thickness of said reinforcing substrate, and
said reinforcing substrate is impregnated with said outer polyurethane layer from the other surface side of said reinforcing substrate to the position where said reinforcing substrate is impregnated with said inner polyurethane layer.

14. The method of manufacturing a papermaking belt according to claim 13, wherein said reinforcing substrate contains multi-woven fabric.

15. The method of manufacturing a papermaking belt according to claim 12, including a step of winding said reinforcing substrate on the outer peripheral surface of said inner polyurethane layer before or after hardening said inner polyurethane layer.

16. A papermaking belt comprising a reinforcing substrate embedded in a thermosetting polyurethane layer including an inner polyurethane layer and an outer polyurethane layer adhering to the outer peripheral surface of said inner polyurethane layer,
wherein the composition forming said inner polyurethane layer being prepared by mixing a urethane prepolymer and a hardener with each other in a ratio setting the equivalent ratio (H/NCO) between the active hydrogen groups (H) of the hardener and the isocyante groups (NCO) of the urethane prepolymer to $0.85 \leq H/NCO < 1$.

* * * * *

UNITED STATES PATENT AND TRADEMARK OFFICE
CERTIFICATE OF CORRECTION

| | |
|---|---|
| PATENT NO. | : 7,090,747 B2 |
| APPLICATION NO. | : 10/415401 |
| DATED | : August 15, 2006 |
| INVENTOR(S) | : Atsuo Watanabe et al. |

It is certified that error appears in the above-identified patent and that said Letters Patent is hereby corrected as shown below:

On the Title page, item (54) and Col. 1, Line 1-2, please amend the title as follows:

--BELT FOR PAPERMAKING AND PROCESS FOR PRODUCING PAPERMAKING BELT--.

Signed and Sealed this

Nineteenth Day of June, 2007

JON W. DUDAS
*Director of the United States Patent and Trademark Office*